(12) United States Patent
Moulinet

(10) Patent No.: US 6,517,278 B2
(45) Date of Patent: Feb. 11, 2003

(54) SHAFT ASSEMBLY FOR BALL-TYPE CONSTANT VELOCITY JOINTS

(75) Inventor: François Moulinet, Triel sur Seine (FR)

(73) Assignee: GKN Automotive AG, Lohmar (DE)

( * ) Notice: Subject to any disclaimer, the term of this patent is extended or adjusted under 35 U.S.C. 154(b) by 0 days.

(21) Appl. No.: 09/776,442

(22) Filed: Feb. 2, 2001

(65) Prior Publication Data

US 2001/0018368 A1 Aug. 30, 2001

(30) Foreign Application Priority Data

Feb. 3, 2000 (FR) .............................................. 0001380

(51) Int. Cl.[7] ........................... F16D 1/116; F16D 1/072
(52) U.S. Cl. ...................... 403/359.5; 464/182; 464/906
(58) Field of Search ................................ 464/145, 182, 464/906; 403/274, 359.5

(56) References Cited

U.S. PATENT DOCUMENTS

| | | | |
|---|---|---|---|
| 3,396,554 A | | 8/1968 | Westercamp |
| 4,652,169 A | * | 3/1987 | Matthews ................ 403/282 X |
| 5,290,203 A | * | 3/1994 | Krude ......................... 464/145 |
| 5,536,101 A | * | 7/1996 | Schwarzler et al. ..... 403/274 X |
| 5,607,358 A | * | 3/1997 | Stall et al. ............... 464/182 X |
| 5,692,961 A | * | 12/1997 | Turner ..................... 464/906 X |
| 5,779,551 A | * | 7/1998 | Stall et al. ............... 464/906 X |

FOREIGN PATENT DOCUMENTS

| | | |
|---|---|---|
| CH | 368345 | 5/1963 |
| DE | 42 20 224 C 1 | 1/1993 |
| DE | 195 13 992 | * 10/1996 |
| DE | 195 36 057 C1 | 6/1997 |
| WO | 95/34434 | * 12/1995 |

* cited by examiner

Primary Examiner—Greg Binda

(57) ABSTRACT

An assembly comprising a shaft (14) and a female part (6) fixed in terms of rotation on the shaft by rotational-fixing means which cooperate through complementary shapes (16), the female part also being fixed axially on the shaft, and the female part (6; 160; 360) comprising axial first stops (52; 54; 152) which cooperate with associated second stops (44; 46; 144) belonging to the shaft. The first and second stops (44; 46; 52; 54; 144; 152) act in the direction of mounting. The female part (6) further comprises first axial-retention surfaces (60; 160; 360) cooperating with associated second axial-retention surfaces (50; 150; 350) belonging to the shaft. The first and second retention surfaces (50; 60; 150; 160; 350; 360) act in the opposite direction to mounting. The invention applies in particular to ball-type constant-velocity joints for motor vehicles.

27 Claims, 3 Drawing Sheets

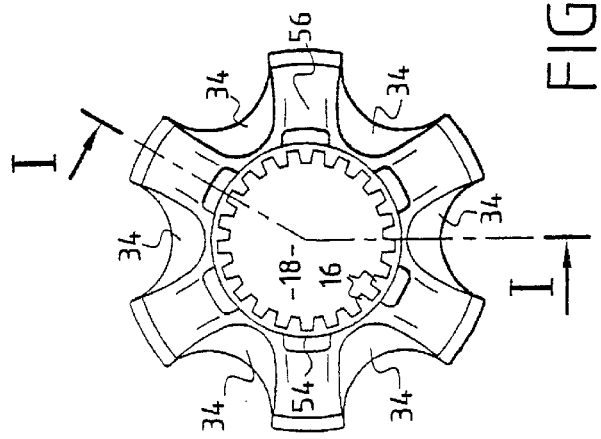
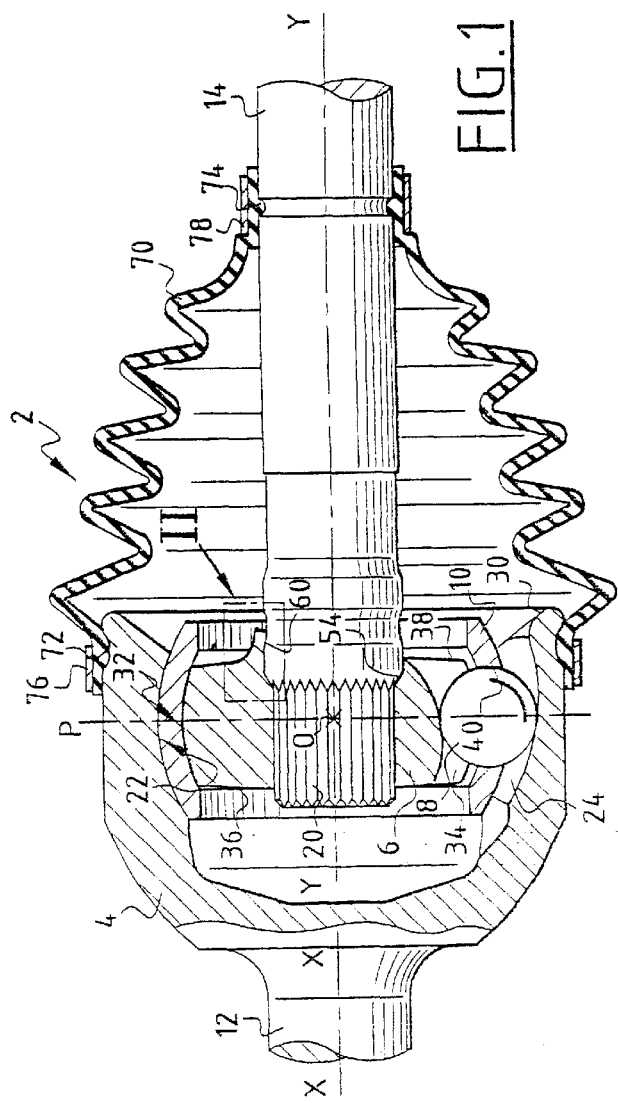
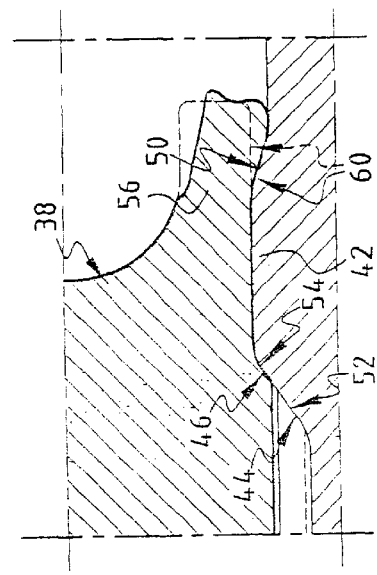

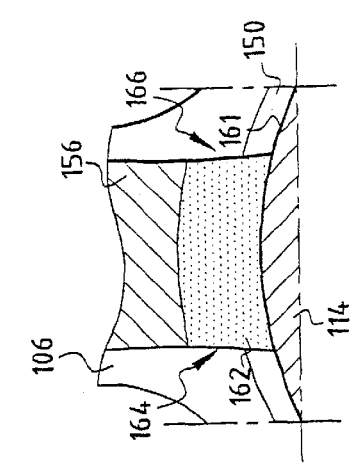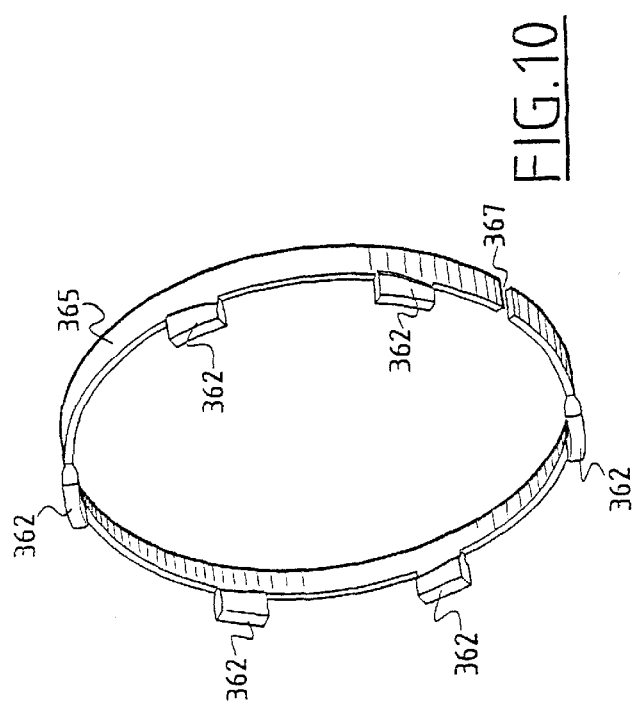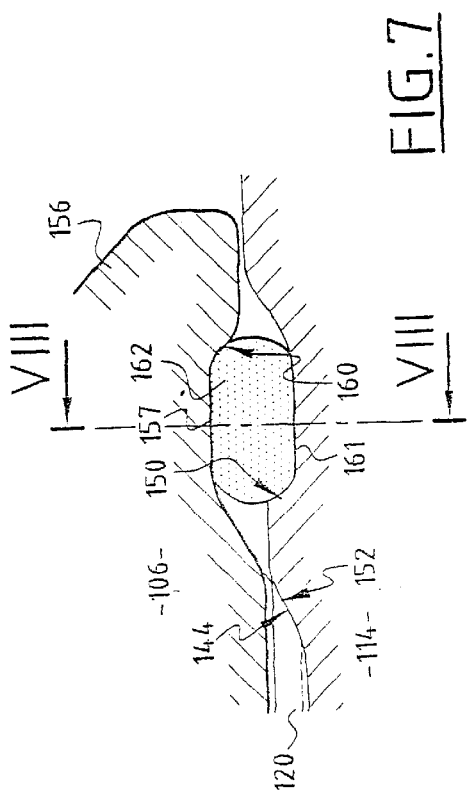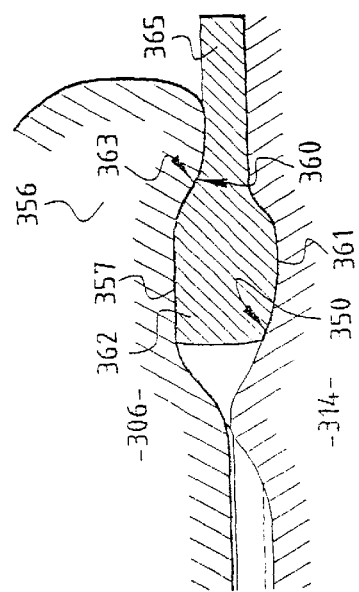

SHAFT ASSEMBLY FOR BALL-TYPE CONSTANT VELOCITY JOINTS

BACKGROUND OF THE INVENTION

The present invention relates generally to a shaft assembly for ball-type constant velocity joints. Ball-type joints are widely used, for example, in the field of motor vehicle wheel shafts. A joint such as this generally comprises a bell socket connected firmly to a first shaft and a central element secured to a second shaft and housed in the bell socket.

The bell socket and the central element each have six runway tracks distributed at equal angles, on their interior and exterior surfaces respectively. A ball is housed in each pair of tracks so as to transmit torque from the central element to the bell socket and so as to allow the joint to articulate during operation.

A cage fitted between the bell socket and the central element prevents the balls from escaping. The central element is firmly fixed in terms of rotation on the shaft by associated splined profiles. Axial attachment of the central element is achieved in a first direction by stop surfaces, for example a shoulder of the shaft against which the central element abuts. In the second direction, the central element is retained by a split ring housed in a groove formed in the shaft.

This conventional assembly has several drawbacks. For example, between the split ring and the central element or between the central element and the stop surfaces there is a clearance which allows the central element a small axial movement. This leads to the generation of noise while the joint is in operation. In order to keep this clearance as small as possible, close tolerances are needed, which is expensive from a manufacturing standpoint.

In addition, the split rings are relatively complicated to mount and this mounting is difficult to automate because of the precision required in positioning the ring. In addition, in instances where the ring is covered by the central element, there is a problem of groove accessibility at the time of mounting and/or removal.

Furthermore, because the split ring is located inside the joint, there is problem with accessing this ring when the central element needs to be removed.

SUMMARY OF THE INVENTION

An object of the invention is to provide an assembly which will simply and reliably eliminate any axial play, particularly in the aforementioned application.

The foregoing and other objects are obtained by an assembly comprising a shaft and a female part which is fixed in terms of rotation on the shaft by rotational-fixing means which cooperate by having complementary shapes. The female part is also fixed axially on the shaft. The female part comprises axial stop means which cooperate with associated stop means belonging to the shaft. The stop means act in the direction of mounting. The female part further comprises axial-retention surfaces cooperating with associated axial-retention surfaces belonging to the shaft. The retention surfaces act in the opposite direction to mounting. The retention surfaces are arranged beyond said associated means in the direction of mounting and cooperate through complementary shapes.

Another object of the invention is to provide a ball-type joint comprising an assembly as defined hereinabove, and a female part intended to be used as the female part of an assembly as defined hereinabove.

Other objects and advantages of the invention will become apparent upon reading the following detailed description and appended claims, and upon reference to the accompanying drawings.

BRIEF DESCRIPTION OF THE DRAWINGS

The invention will be better understood from reading the specification which will follow, given solely by way of example with reference to the appended drawings, in which:

FIG. 1 is a view in longitudinal section, on two axial half-planes which correspond to the line I—I in FIG. 3, of a ball-type joint comprising an assembly according to a first embodiment of the invention.

FIG. 2 shows detail II of FIG. 1, on a larger scale.

FIG. 3 is a view from the right of the central element of the joint of FIG. 1.

FIG. 7 depicts a detail of an assembly according to a second embodiment of the invention, the view corresponding to FIG. 2 of the first embodiment.

FIG. 8 is a view in section on VIII—VIII of FIG. 7.

FIG. 9 depicts a detail of an assembly according to a variant of the second embodiment of the invention, the view corresponding to FIG. 2 of the first embodiment.

FIG. 10 is a view of a corresponding locking ring.

DETAILED DESCRIPTION OF THE INVENTION

Figure 4:
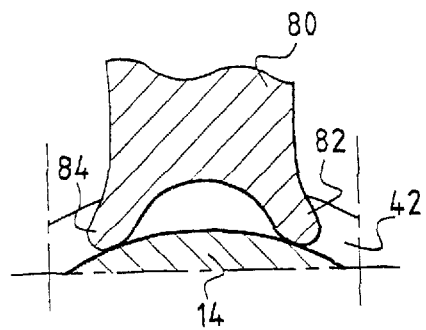
FIG. 4 shows, in detail, and viewed in cross section, an assembly according to a first variant of the embodiment of FIG. 1.

The constant-velocity joint 2 depicted in FIG. 1 consists of two main parts, namely an outer bell socket 4 and a central element 6. Between the ball socket 4 and the central element 6, there are six balls 8 (only one of which is visible in FIG. 1) and a cage 10 for keeping the balls in the plane bisecting the joint. When the joint 2 is mounted, the bell socket 4 is secured to a first shaft 12 of axis X—X, and the central element 6 is secured to a second shaft 14 of axis Y—Y. These two axes are coaxial in FIG. 1, in which the joint 2 is aligned.

The expression "direction of mounting" will refer in what follows to the direction in which the central element 6 is displaced on the second shaft 14 at the time of mounting.

The bell socket 4 is typically formed integrally with the first shaft 12, which is a stub axle of a driving wheel. The central element 6 is fixed firmly in terms of rotation to the second shaft 14, which is a drive shaft, by means which cooperate through having complementary shapes. In this particular instance, these means consist of axial splines 16 provided in the central opening 18 (see FIG. 3) of the central element 6. The second shaft 14 comprises associated splines 20.

The bell socket 4 has a spherical cavity 22 of center O located on the axis X—X. This cavity 22 is open toward said second shaft 14 and in its wall are made six first grooves 24, distributed at equal angles and each of which is contained in an axial half-plane of the bell socket 4. Each groove 24 extends on each side of the diametral plane P of the bell socket 4 perpendicular to the axis X—X and opens onto an entry chamfer 30 of the bell socket 4.

The central element 6 has a spherical exterior surface 32 of center O in which are formed six second grooves 34 which are distributed at equal angles and each contained in an axial half-plane of the central element 6. These grooves 34 extend on each side of the diametral plane of the central element 6 which is merged with the plane P when the joint 2 is aligned, and they open onto the two end faces of the central element, namely the socket end 36 and the shaft end 38.

The cage 10 comprises exterior and interior spherical surfaces of center O which cooperate respectively with the aforementioned spherical surfaces 22, 32 of the central element 6 and of the bell socket 4. It additionally comprises six slots 40 in each of which one ball 8 is guided in the conventional way. Each ball 8 cooperates with a pair of grooves 24, 34, which form runway tracks.

Referring in particular to FIG. 2, it can be seen that a bulge 42 connects to the splines 20 of the second shaft 14, at the shaft end, and forms oblique stop surfaces. These stop surfaces consist, at the spline end, of surfaces 44 at the bottoms of the splines 20 and of the frustoconical surface 46 of the bulge 42 which extends beyond the splines 20.

The bulge 42 forms, at the shaft end, oblique axial-retention surfaces 50 located beyond the stop surfaces 44, 46 in the direction of mounting.

As depicted, the retention surfaces may be formed of an annular groove formed in the second shaft 14.

At the end facing toward the mounting direction, the splines 16 of the central element comprise chambers 52 to which a frustoconical surface 54 connects, thus forming stop surfaces that complement those of the second shaft 14, and which act in the direction of mounting.

Six fixing tabs 56 project from the shaft-end end face 38 of the central element. They are distributed at equal angles between the second grooves 34 (see FIG. 3) and extend in the direction of mounting. The length of the fixing tabs 56 is chosen such that their ends protrude beyond the bulge 42 of the second shaft 14 when the stop surfaces belonging to the central element and to the shaft are cooperating.

The radially interior surface 60 of each tab 56 extends, in the unmounted state, parallel to the axis Y—Y of the second shaft 14 and at a distance from this axis which corresponds to the maximum radius of the bulge 42, as shown in broken line in FIG. 2.

The central element 6 is mounted on the second shaft 14 as follows:

The central element 6 is slipped onto the end of the second shaft 14 such that the splines 16, 20 of the shaft 14 and of the central element 6 cooperate. The slipping-on movement is continued until the stop surfaces 52, 54 of the central element press against the stop surfaces 44, 46 of the shaft. In this position, the ends of the fixing tabs 56 of the central element 6 protrude beyond the bulge 42 of the second shaft 14.

Next, the ends of the fixing tabs 56 are locally plastically deformed radially inward by a crimping operation, until they press against the retention surfaces 50 belonging to the second shaft 14.

Deformation may be performed by any known means, in the hot or in the cold state.

When mounted, the radially interior surface 60 of each tab end, after folding down toward the axis Y—Y as described above, forms a retention surface pressing, with complementary shape and without axial play, against the retention surface 50 of the second shaft 14, thus forming retention means acting in the opposite direction to mounting.

In order to plastically deform the tabs 56, it is preferable that they not be hardened. However, in order to avoid wear, the runway tracks 34 should be hardened. This situation may be achieved, for example, by local heat treatment of the tracks 34 or by masking the tabs 56 when employing an overall case-hardening process.

Finally, in the known way, a protective boot 70 is gripped, on the one hand, in a groove 72 belonging to the bell socket 4 and, on the other hand, in a groove 74 formed in the second shaft 14, by two clamping collars 76, 78, to avoid dirt getting into the joint 2 and to retain the lubricant.

It is noted that local deformation of zones of small thickness 56 belonging to the central element makes it possible to fix the central element 6 axially onto the shaft 14 in a play-free manner, thus eliminating the generation of noise during operation.

In addition, this embodiment has the advantage that the number of parts is small, as, consequently, is the cost of manufacture. The fact that the collaboration of the retention surfaces is achieved by plastic deformation avoids the need for close manufacturing tolerances.

It is to be noted that, as a variant, the central element 6 may have less than six fixing tabs 56, or alternatively that just some of the six fixing tabs 56, for example two tabs, are deformed.

FIG. 4 depicts a first variant of the fixing of the central element to the shaft. In this variant embodiment of the invention, ribs 80 arranged on the central element 6 and extending substantially axially in the direction of mounting each have two fixing tabs 82, 84 projecting roughly circumferentially on their two opposed sides. To fix the central element 6 onto the shaft 14, the tabs 82, 84 are plastically deformed radially inward until they apply on the surfaces 50 of the shaft 14.

Figure 5:
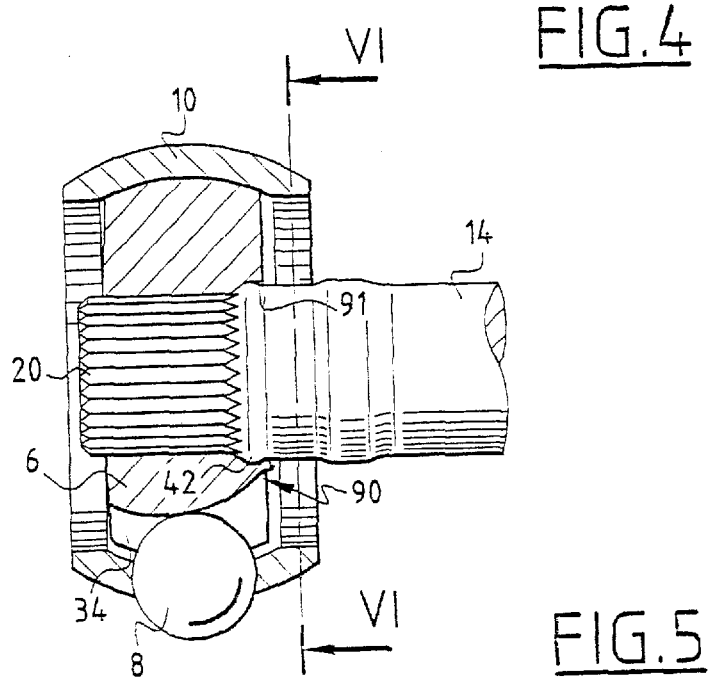
FIG. 5 is a view in longitudinal section on two axial half-planes which correspond to the line I—I of FIG. 3, of part of a ball-type joint comprising an assembly according to a second variant of the first embodiment.
Figure 6:
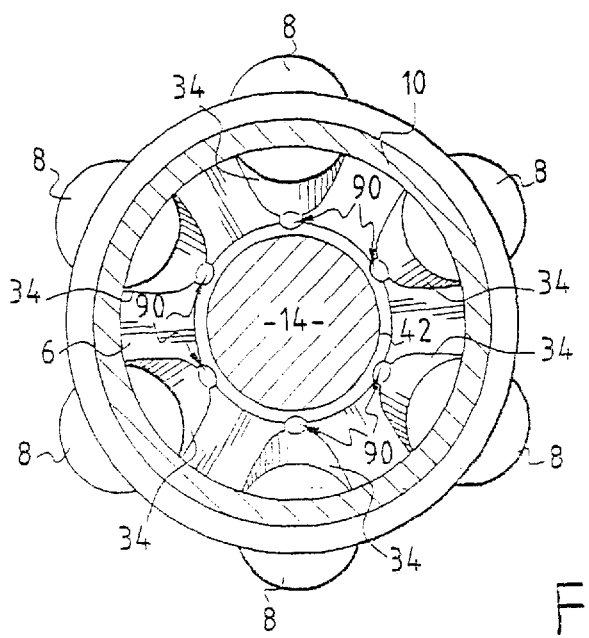
FIG. 6 is a view in section on VI—VI of FIG. 5.

FIGS. 5 and 6 depict a second variant of the fixing of the central element 6 on the shaft 14 of the embodiment of FIG. 1.

At the bottom of each runway track 34 of the central element there is a zone 90 located at the shaft end of this track and which is not loaded by the ball 8 during operation, even when the joint 2 is articulated to its maximum angle. This zone 90 has a small thickness comparable with the thickness of the end of the fixing tab 56 of the central element 6 of FIG. 1, thanks to a counterbore 91.

In consequence, the central element 6 has no fixing tabs, but the zones 90 are plastically deformed radially inward and axially fix the central element 6 through being crimped against the surfaces 50. In order to account for the fact that the deformed zone 90 is displaced axially in the opposite direction to the direction of mounting as compared with the variant of FIG. 1, the bulge 42 of the shaft is shifted and modified accordingly.

The mounting steps remain similar to those of the variant of FIG. 1.

It is to be noted that the runway tracks 34 are not hardened in the zone 90 (not loaded by the balls) that is to be deformed.

FIGS. 7 and 8 depict a second embodiment of the invention. FIG. 7 corresponds to FIG. 2 of the first embodiment of the invention. The elements which perform functions similar to those of the first embodiment carry the same references increased by 100.

Each fixing tab 156 belonging to the central element 106 has, on its radially interior surface, a recess 157 extending substantially circumferentially with respect to the axis of the second shaft 114, in the mounted state. The axial-retention surface 160 is formed by the undercut surface which delimits the recess 157 at its end closest to the end of the fixing tab 156.

In contrast to the first embodiment, the fixing tab 156 is not intended to be deformed.

As previously, the shaft 114 has an annular groove referenced 161. This groove is directly facing the recesses 157 when the stop surfaces 144, 152 of the shaft and of the central element are cooperating. The axial-retention surface 150 of the shaft delimits the annular groove 161 at the same end of the shaft as the splines 120.

Collaboration between the axial-retention surface 160 of each fixing tab 156 and the axial-retention surface 150 of the shaft through complementary shapes is achieved indirectly via a locking member 162 which transmits the axial-retention force. The locking member 162 consists of solidified fluid substance, particularly a thermoset material, injected in the fluid state into the empty space between the two retention surfaces 150, 160.

As a variant, any other appropriate material, such as, for example, brazing filler may be used.

The central element 106 is mounted on the second shaft 114 in a way similar to that of the first embodiment. However, having slipped the central element 106 onto the shaft 114, the fluid substance is injected through at least one of the two lateral openings 164, 166 of the aforementioned empty space.

It is seen that this embodiment also allows the central element to be fixed axially onto the shaft easily without axial play.

FIG. 9 shows a variant of the second embodiment of the invention. FIG. 9 corresponds to FIG. 7 of the previous variant. The references of the elements which are similar to those of this previous variant are increased by 200.

The central element 306 comprises fixing tabs 356 with recesses 357 and the shaft 314 has an annular groove 361, all these features being similar to those of the previous variant.

However, the locking member is a separate part. This separate part is a strip 362 which in radial cross section is substantially rectangular with rounded corners, complementing the shape of the empty space between the recess 357 and the annular groove 361. The circumferential dimension of the strip 362 is substantially equal to that of said empty space and to that separating the tabs 356, and its axial length increases slightly in a circumferential direction, so as to form a wedging surface 363 acting in the axial direction in the mounted state.

Six strips 362 are connected, by the middle part of their end surface at the shaft end, to form one piece with a ring 365, as depicted in FIG. 10. The strips 362 are distributed at angles on the ring in a way that corresponds to the fixing tabs 356 of the central element 306.

Furthermore, the ring 365 has a split 367 to make it possible to mount it on the shaft.

In this variant, the central element 306 is mounted on the shaft 314 as follows.

First, the central element 306 is slipped onto the end of the shaft 314, as described above, as far as its axial stop.

Next, the ring 365 is slipped onto the shaft 314 by an axial displacement in such a way that the tabs 356 of the central element 306 are inserted between the strips 362 of the ring 365, until the strips 362 clip into the groove 361 of the shaft. Because of the split 367 made in the ring 365, the ring can easily pass over those sections of the shaft 306 which have a diameter greater than its inside diameter at rest, by elastic deformation.

Next, the ring 365 is rotated with respect to the longitudinal axis of the shaft 314 until the strips 362 are aligned with the fixing tabs 356 of the central element, thus simultaneously through a wedge effect immobilizing all the pairs of retention surfaces 350/360. The ring 365 is locked against rotation by the friction of the strips 362. It can be locked additionally by welding or bonding.

It is noted that the retention of the central element on the shaft by retention surfaces which are beyond the stop surfaces allows the attachment free of axial play by using a space available in this region of the joint.

From the foregoing, it will be seen that there has been brought to the art a new and improved shaft assembly which overcomes the drawbacks associated with prior shaft assemblies. While the invention has been disclosed in connection with one or more embodiments, it will be understood that the invention is not limited to those embodiments. On the contrary, the invention covers all alternatives, modifications, and equivalents as may be included in the spirit and scope of the appended claims.

What is claimed is:

1. An assembly comprising a shaft and a female part which is rotationally fixed to said shaft by rotational-fixing means which cooperate through complementary shapes, said shaft comprising a shaft end portion on which said female part is mounted in a direction of mounting from said shaft end portion to an intermediate shaft portion remote from said shaft end portion, the female part also being fixed axially on said shaft, and the female part comprising axial first stops which cooperate with respective second stops associated with said shaft, the first and second stops acting in said direction of mounting, the female part further comprising first axial-retention surfaces cooperating with respective second axial-retention surfaces associated with said shaft, said first and second axial-retention surfaces acting in a direction opposite to said direction of mounting, wherein said first and second axial-retention surfaces are arranged beyond said associated first and second stops in said direction of mounting and cooperate through complementary shapes.

2. The assembly as claimed in claim 1, wherein the rotational-fixing means comprise axial splines formed on the female part and on the shaft.

3. The assembly as claimed in claim 1, wherein the first axial-retention surfaces are formed by plastically deformable zones which are locally plastically deformed radially inward.

4. The assembly as claimed in claim 3, wherein each plastically deformable zone is formed by a tab which, prior to deformation, projects axially in the direction of mounting.

5. The assembly as claimed in claim 3, wherein each plastically deformable zone is formed by a tab which, prior to deformation, projects circumferentially on a rib extending axially in the direction of mounting.

6. The assembly as claimed in claim 3 wherein said plastically deformable zones are manufactured in one piece with the female part.

7. The assembly as claimed in claim 3 wherein said plastically deformable zones are exposed on a side of said female part opposite to said shaft end portion.

8. The assembly as claimed in claim 3 wherein said plastically deformable zones are configured such that, during plastic deformation of said plastically defiable zones, said shaft is not plastically deformed.

9. The assembly as claimed in claim 3, wherein the plastically deformable zones are formed by recesses formed in the female part and which open radially outward.

10. A shaft assembly according to claim 1 wherein the rotational-fixing means comprise a first rotational-fixing means end directed towards said shaft end portion and a second rotational-fixing means end opposite said first rotational-fixing means end and the axial first stops connect to the rotational-fixing means at said first rotational-fixing means end.

11. The assembly as claimed in claim 1 wherein said first and second stops are axially spaced from said rotational-fixing means.

12. The assembly as claimed in claim 1 wherein said first and second stops are adapted to define an axial position of the female part on said shaft before said first and second axial-retention surfaces act in said direction opposite to said direction of mounting.

13. The assembly as claimed in claim 1 wherein said female part comprises a female part end remote from said shaft end portion, and said first and second axial-retention surfaces are arranged adjacent said female part end.

14. The assembly as claimed in claim 1, wherein a locking member which transmits an axial-retention force is interposed between each first and second axial-retention surface.

15. The assembly as claimed in claim 14, wherein the locking member comprises solidified fluid material injected in a fluid state into a space between cooperating first and second axial-retention surfaces.

16. The assembly as claimed in claim 15, wherein the locking member is a wedge.

17. The assembly as claimed in claim 16 comprising several pairs of respective first and second axial-retention surfaces separated by recesses, and wherein a locking member is interposed in each said recess, the locking members being joined together by a ring, so as to allow the pairs of respective first and second axial-retention surfaces to be immobilized simultaneously by an axial and rotary displacement of the ring.

18. An assembly comprising a shaft and a ball-type constant velocity joint including, a central element, wherein said central element is rotationally fixed to said shaft by rotation-fixing means which cooperate through complementary shapes, said shaft comprising a shaft end portion on which said central element is mounted in a direction of mounting from said shaft end portion to an intermediate shaft portion remote from said shaft end portion, the central element also being fixed axially on said shaft and comprising axial first stops which cooperate with respective second stops associated with said shaft, the first and second stop acting in said direction of mounting, the central element further comprising first axial-retention surfaces cooperating with respective second axial-retention surfaces associated with said shaft, said first and second axial-retention surfaces acting in a direction opposite to said direction of mounting, wherein said first and second axial-retention surfaces are arranged beyond said associated first and second stops in said direction of mounting and cooperate through complementary shapes.

19. An assembly according to claim 18 wherein the rotational-fixing means comprise a first rotational-fixing means end directed towards said shaft end portion and a second rotational-fixing means end opposite said first rotational-fixing means end and the axial first stops connect to the rotational-fixing means at said first rotational-fixing means end.

20. The assembly as claimed in claim 18 wherein said first and second stops are axially spaced from said rotational-fixing means.

21. The assembly as claimed in claim 18 wherein said first and second stops are adapted to define an axial position of the central element on said shaft before said first and second axial-retention surfaces act in said direction opposite to said direction of mounting.

22. The assembly as claimed in claim 18 wherein said central element comprises a central element end remote from said shaft end portion, and said first and second axial-retention surfaces are arranged adjacent said central element end.

23. The assembly as claimed in claim 18 wherein the first axial-retention surfaces are formed by plastically deformable zones each comprising a tab, which are locally plastically deformed radially inward and which, prior to deformation, project axially in the direction of mounting and which are located angularly between runway tracks associated with respective balls, said plastically deformable zones being manufactured in one piece with the central element.

24. The assembly as claimed in claim 18 wherein the first axial-retention surfaces are formed by plastically deformable zones each comprising a tab, which are locally plastically deformed radially inward and which, prior to deformation, project axially in the direction of mounting and which are located angularly between runway tracks associated with respect balls, said plastically deformable zones being exposed on a side of said central element opposite to said shaft end portion.

25. An assembly according to claim 18 wherein the first axial-retention surfaces comprise a recess formed in said central element and open radially outward, said recess located at the bottom of a runway track associated with a respective ball.

26. An assembly comprising a shaft and a ball-type constant velocity joint including a central element, wherein said central element is rotationally fixed to said shaft by rotation-fixing means which cooperate through complementary shapes, the central element also being fixed axially on said shaft and comprising axial first stops which cooperate with respective second stops associated with said shaft, the first and second stops acting in the direction of mounting, the central element further comprising first axial-retention surfaces cooperating with respective second axial-retention surfaces associated with said shaft, said first and second axial-retention surfaces acting in the opposite direction of mounting, wherein said first and second axial-retention surfaces are arranged beyond said associated first and second stops in the direction of mounting and cooperate through complementary shapes, and wherein the first axial-retention surfaces are formed by zones of small thickness each comprising a tab, which are locally plastically deformed radially inward and which, prior to deformation, project axially in the direction of mounting, and which are located angularly between runway tracks associated with respective balls.

27. An assembly comprising a shaft and a ball-type constant velocity joint including a central element, wherein said central element is rotationally fixed to said shaft by rotation-fixing means which cooperate through complementary shapes, the central element also being fixed axially on said shaft and comprising axial first stops which cooperate with respective second stops associated with said shaft, the first and second stops acting in the direction of mounting, the central element further comprising first axial-retention surfaces cooperating with respective second axial-retention surfaces associated with said shaft, said first and second axial-retention surfaces acting in the opposite direction of mounting, wherein said first and second axial-retention surfaces are arranged beyond said associated first and second stops in the direction of mounting and cooperate through complementary shapes, and wherein the first axial-retention surfaces are formed by zones of small thickness each comprising a tab, which are locally plastically deformed radially inward and which, prior to deformation, project circumferentially on a rib extending axially in the direction of mounting, and which are located angularly between runway tracks associated with respective balls.

* * * * *